United States Patent
Sun et al.

(10) Patent No.: US 8,310,631 B2
(45) Date of Patent: Nov. 13, 2012

(54) REFLECTIVE POLARIZER WITH MICRO-BEADS AND BLUE COLORANT

(75) Inventors: Yu-Ming Sun, Tainan (TW); Chin-Yi Liao, Rende Township, Tainan County (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 279 days.

(21) Appl. No.: 12/639,529

(22) Filed: Dec. 16, 2009

(65) Prior Publication Data

US 2011/0013120 A1 Jan. 20, 2011

(30) Foreign Application Priority Data

Jul. 17, 2009 (TW) .............................. 98124325 A

(51) Int. Cl.
*G02F 1/1335* (2006.01)
*C09K 19/02* (2006.01)

(52) U.S. Cl. ......... 349/115; 349/175; 349/176; 349/185

(58) Field of Classification Search .................. 349/115, 349/175–176, 185
See application file for complete search history.

(56) References Cited

U.S. PATENT DOCUMENTS

| 4,950,537 | A * | 8/1990 | Vesley et al. ................... 428/345 |
| 5,077,158 | A * | 12/1991 | Nakano .................... 430/123.56 |
| 6,433,853 | B1 * | 8/2002 | Kameyama et al. .......... 349/176 |
| 7,057,813 | B2 * | 6/2006 | Umeya et al. ................. 359/459 |
| 7,342,619 | B2 * | 3/2008 | Arakawa et al. ................ 349/96 |
| 2007/0242184 | A1 * | 10/2007 | Ohta et al. ....................... 349/64 |
| 2008/0259243 | A1 * | 10/2008 | Ohta et al. ....................... 349/64 |

FOREIGN PATENT DOCUMENTS

| JP | 2003227933 A | * | 8/2003 |
| SU | 1190345 | * | 11/1985 |
| TW | I264570 | | 10/2006 |

* cited by examiner

*Primary Examiner* — Hoan C Nguyen
(74) *Attorney, Agent, or Firm* — Muncy, Geissler, Olds & Lowe, PLLC

(57) ABSTRACT

In this disclosure, a blue colorant is added in the adhesion layer of a reflective polarizer to compensate the chromaticity difference caused by the reflective polarizer itself and large horizontal viewing angle. The chromaticity difference can be further reduced by adding beads in the adhesion layer and/or forming light-gathering microstructures on the outer surface of the quarter wave plate of the reflective polarizer.

18 Claims, 4 Drawing Sheets

US 8,310,631 B2

REFLECTIVE POLARIZER WITH MICRO-BEADS AND BLUE COLORANT

CROSS-REFERENCE TO RELATED APPLICATION

This application claims the priority benefit of Taiwan application serial no. 98124325, filed Jul. 17, 2009, the full disclosure of which is incorporated herein by reference.

BACKGROUND

1. Technical Field

The disclosure relates to an optical film. More particularly, the disclosure relates to a reflective polarizer to increase the use efficiency of light source and decrease the chromaticity differences among various viewing angles.

2. Description of Related Art

Among planar display devices, only liquid crystal displays (LCDs) use linearly polarized light to produce bright, dark and gray levels. Generally, the main structure of a LCD includes LCD panel and backlight module. The basic displaying principle is providing light by the backlight module and producing linearly polarized light after the light penetrates a polarizer. Next, various gray levels between bright and dark states are produced by liquid crystal molecules in various twisted states to display images on the LCD panel.

However, the total brightness of LCDs is only 4-6% of the light intensity provided by their light source. The dichroic polarizer in the LCD panel is one of the main causes of the loss of the light intensity, since only one half of the light can penetrate the dichroic polarizer. Therefore, if the light can be transformed into linearly polarized light being capable of penetrating the dichroic polarizer before the light penetrate the dichroic polarizer, the use efficiency of the incident light can be greatly increased to solve the poor brightness problem of LCDs.

To solve the poor brightness problem above, the most usual way is using various optical films in the backlight module to increase the LCDs' brightness. One way is adapting the reflective polarizing technology to recycle the incident light to increase LCDs' brightness. The reflective polarizing technology includes reflective polarizer, such as Dual Brightness Enhancement Film of 3M, for treating linearly polarized light and cholesteric liquid crystal phase reflective polarizer for treating circular polarized light. The reflective polarizer needs high level multi-layer process, hence the price is expensive. The manufacturing method of cholesteric liquid crystal phase reflective polarizer is simpler; hence is the production cost can be effectively reduced.

The choleteric liquid crystal of the cholesteric liquid crystal phase reflective polarizer is used to separate right and left circular polarized light of circular polarized light. One of the right and left circular polarized light can penetrate the cholesteric liquid crystal layer, and the other one is reflected by the cholesteric liquid crystal layer. The reflective plate of a backlight module, which is usually in LCDs, can be used to reverse the reflected circular polarized light to penetrate the cholesteric liquid crystal layer. Therefore, a single circular polarized light with two times intensity is obtained. If a quarter wave film is attached on the outer surface of the cholesteric liquid crystal layer, the passed circular polarized light can be convert into linearly polarized light with two times intensity. In addition, the direction of the polarization plane of the linearly polarized light is the same as the direction of the optic axis of the polarizer to increase the brightness.

However, the cholesteric liquid crystal phase reflective polarizer has optical anisotropy. Therefore, the color of the reflective light changes with the viewing angle changes to generate the problem of chromaticity difference. FIG. 1 is a diagram of the chromaticity difference changes with the viewing angle changes. In FIG. 1, the chromaticity difference is more serious when the horizontal viewing angle is larger.

SUMMARY

According to an embodiment, a reflective polarizer is provided to solve the chromaticity difference problem of LCDs.

The reflective polarizer comprises a cholesteric liquid crystal (LC) layer, a quarter wave plate; and an adhesion layer located between the cholesteric LC layer and the quarter wave plate. The adhesion layer comprises an adhesive, and a blue colorant.

According to another embodiment, a backlight module including the reflective polarizer above is provided. The backlight module meets the requirements below:

$\Delta X_{0°} = [(\Delta x_{0°})^2 + (\Delta y_{0°})^2]^{1/2} \leq 0.04$, wherein $\Delta x_{0°}$ and $\Delta y_{0°}$ are absolute values of chromaticity differences, viewed from a normal direction, between liquid crystal displays (LCDs) with and without the reflective polarizer respectively at x axis and y axis; and $\Delta X_{60°} = [(\Delta x_{60°})^2 + (\Delta y_{60°})^2]^{1/2} \leq 0.07$, wherein $\Delta x_{60°}$ and $\Delta y_{60°}$ are absolute values of chromaticity differences between a normal viewing angle and a horizontal viewing angle at 60° of a LCD with the reflective polarizer respectively at x axis and y axis.

It is to be understood that both the foregoing general description and the following detailed description are by examples, and are intended to provide further explanation of the invention as claimed.

DETAILED DESCRIPTION

Structure of Reflective Polarizer

Figure 1:
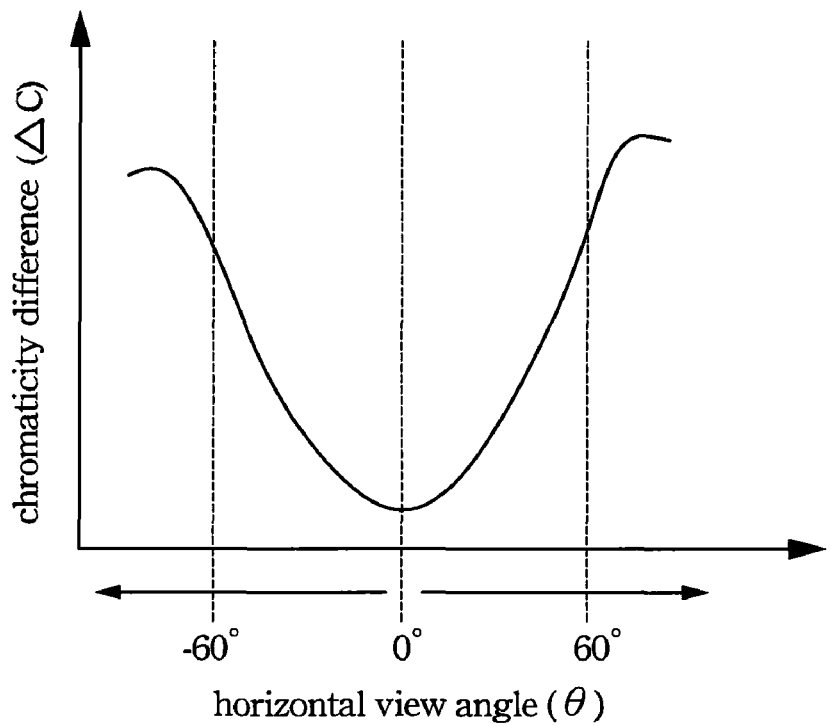
FIG. 1 is a diagram of the chromaticity difference changes with the horizontal viewing angle changes.
Figure 2:
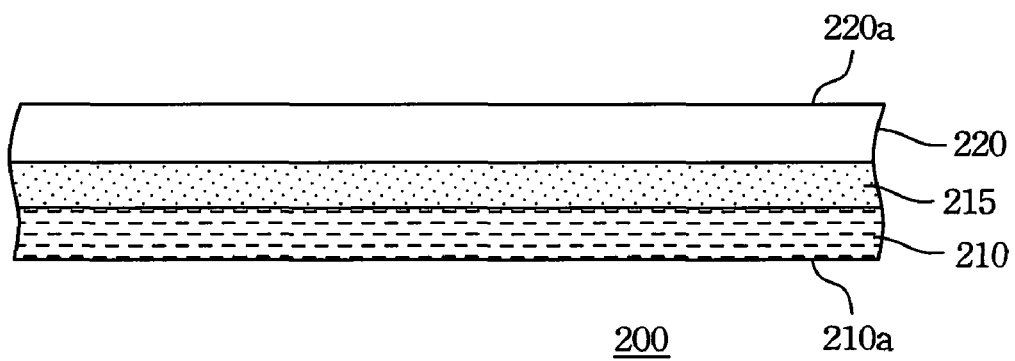
FIG. 2 is a cross-sectional diagram of a reflective polarizer according to an embodiment.

FIG. 2 is a cross-sectional diagram of a reflective polarizer according to an embodiment. In FIG. 2, the reflective polarizer 200 sequentially includes a cholesteric liquid crystal layer 210, an adhesion layer 215, and a quarter wave plate 220.

The cholesteric liquid crystal layer 210 can be spiral-arranged cholesterol molecules, nematic liquid crystal molecules doped by chiral molecules, or a combination thereof. According to an embodiment, the cholesteric liquid crystal layer 210 is nematic liquid crystal molecules doped by chiral molecules. The nematic liquid crystal molecules above can be LC1057 or LC 242 produced by BASF Company. The chiral molecules above can be LC756 produced by BASF Company. The cholesteric liquid crystal layer 210 can include multiple layers of cholesterol liquid crystal with various pitches to reflect visible light with various wavelengths.

At least one end of the cholesterol liquid crystal molecules has an unsaturated functional group containing vinyl group. Therefore, the cholesterol liquid crystal molecules can be further cross-linked by heating or irradiating. The unsaturated functional group containing vinyl group can be, but not limited to, vinyl group, allyl group, methyl allyl group, normal butylidene group, iso-butylidene group, vinyl phenyl group, allyl phenyl group, allyloxymethyl group, allyloxyethyl group, allyloxypropyl group, allyloxybutyl group, allyloxypentyl group, allyloxyhexyl group, methyl allyloxymethyl group, methyl allyloxyethyl group, methyl allyloxypropyl group, methyl allyloxybutyl group, methyl allyloxypentyl group, methyl allyloxyhexyl group, or the group shown in structure formula (I) below, for example.

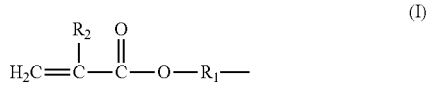

The $R_1$ in structure formula (I) can be phenylene group, cycloalkylene group having 3-8 carbons, alkylene group having 1-8 carbons, alkylenelene group having 2-8 carbons, hydroxyalkene group having 1-8 carbons. The $R_2$ in structure formula (I) can be hydrogen or alkyl group having 1-4 carbons.

The quarter wave plate 220 above can convert circular polarized light into linearly polarized light. The quarter wave plate 220 can be, but not limited to, a stretched polycarbonate retardation film, for example.

The thickness of the adhesion layer 215 can be adjusted according to the needs without special limitations. Generally, the thickness of the adhesion layer 215 is about 1-70 μm and preferably about 15-55 μm.

Figure 3:
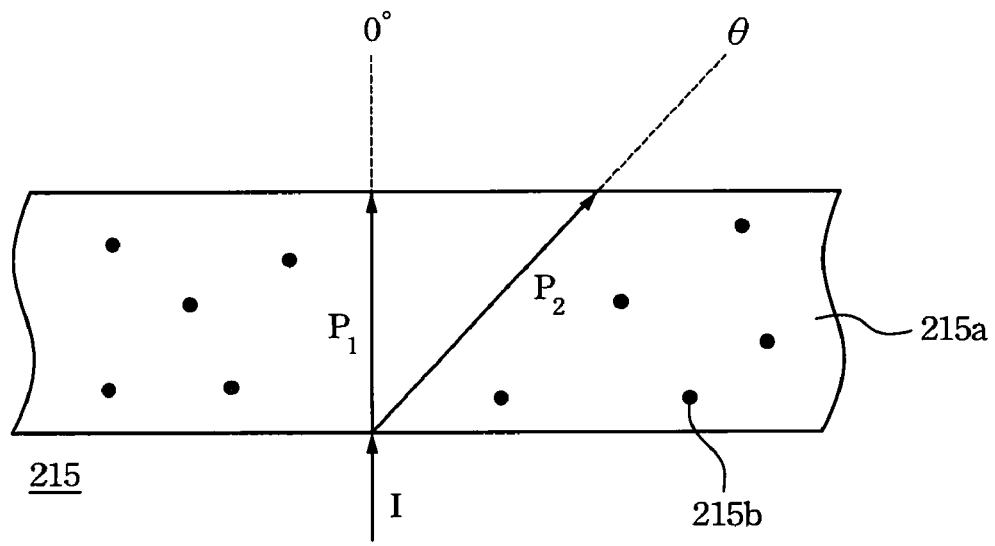
FIG. 3 is a cross-sectional diagram of an adhesion layer according to an embodiment.

The composition of the adhesion layer 215 comprises adhesive and blue colorant. FIG. 3 is a cross-sectional diagram of an adhesion layer according to an embodiment. In FIG. 3, blue colorant 215b is dispersed in the adhesive 215a. The adhesive 215a can bind the quarter wave plate 220 and the cholesteric liquid crystal layer 210.

The adhesive 215a is preferred to have high transparency. The light transmittance of the adhesive 215a is about 90-99.9%. The material of the adhesive 215a can be, but not limited to, acrylate resin or silicone rubber. According to an embodiment, the adhesive 215a can be acrylate resin. The adhesive 215a is about 99.999-99.9 parts by weight when the sum of the blue colorant 215b and the adhesive 215a is 100 parts by weight. The adhesive 215a is preferably about 99.995-99.95 parts by weight The acrylate resin can be, but not limited to, urethane acrylate, epoxy acrylate, polyester acrylate, polyester polyol based acrylate, acrylate homopolymer, or combinations thereof, for example.

The urethane acrylate above can be aliphatic urethane acrylate, aliphatic urethane diacrylate, aliphatic urethane hexaacrylate, or aromatic urethane hexaacrylate, for example.

The epoxy acrylate above can be bisphenol-A epoxy diacrylate, or novolac epoxy acrylate, for example.

The polyester acrylate can be polyester diacrylate, polyester hexaacrylate, or fatty acid modified hexa-functional polyester acrylate, for example.

According to an embodiment, the adhesive 215a can be a pressure sensitive adhesive. The pressure sensitive adhesive in the market includes AO-802® or AO-805® produced by Eternal Company, 8171, 8141, 8142 or 8212 produced by 3M Company, or CS9621 produced by Nitto Denko Company.

As described above, the cholesteric liquid crystal phase reflective polarizer produces the chromaticity difference. Hence, the LCD's displayed color is usually yellowish. Since blue is the complementary color of yellow, the blue colorant 215b in the adhesion layer 215 are molecules that can absorb yellow wavelength to compensate the chromaticity difference problem produced by the cholesteric liquid crystal phase reflective polarizer. The color of the blue colorant 215b can be expressed b* value. In color space of CIE L*a*b, the value of the b* is more negative, the color is more blue. According to an embodiment, the b* value of the blue colorant 215b is about −6.0-0.35 and preferably about −4.0-0.

In FIG. 3, since a viewer may watch the LCD's screen with various horizontal viewing angles, the incident light I strikes the adhesion layer 215 can have various light paths in the adhesion layer 215 to the viewer's eyes. The meaning of "Horizontal viewing angle θ" is the angle between a line of sight and the normal of the screen at the screen's horizontal direction. When the horizontal viewing angle is 0°, the light path of the incident light I in the adhesion layer 215 is $P_1$. When the horizontal viewing angle is θ, the light path of the incident light I in the adhesion layer 215 is $P_2$. Since $P_2$ is longer than $P_1$, the incident light I will be absorbed by more blue colorant 215b to compensate the more serious chromaticity difference when the horizontal viewing angle is θ.

There are no special limitations to the types of the blue colorant 215b. The blue colorant 215b can be natural or synthesized blue dyes, blue pigment, or blue fluorescent materials. The blue colorant 215b is preferred to be blue dye. The blue dye above can be, but not limited to, anthraquinone group dyes, or azo group dyes, for example. The blue pigment can be, but not limited to, phthalocyanine group pigments, for example. The blue fluorescent materials can be, but not limited to, ZnS, for example.

According to an embodiment, the blue colorant is about 0.001-0.1 parts by weight when the sum of the blue colorant and the adhesive is 100 parts by weight. Preferably, the blue colorant is about 0.005-0.05 parts by weight when the sum of the blue colorant and the adhesive is 100 parts by weight. Too much of the incident light will be absorbed to decrease the transmittance of the incident light and thus the brightness gain if the blue colorant 215b is more than 0.1 parts by weight. However, the compensation effect to the chromaticity difference is poor if the blue colorant 215b is less than 0.01 parts by weight.

Figure 4:
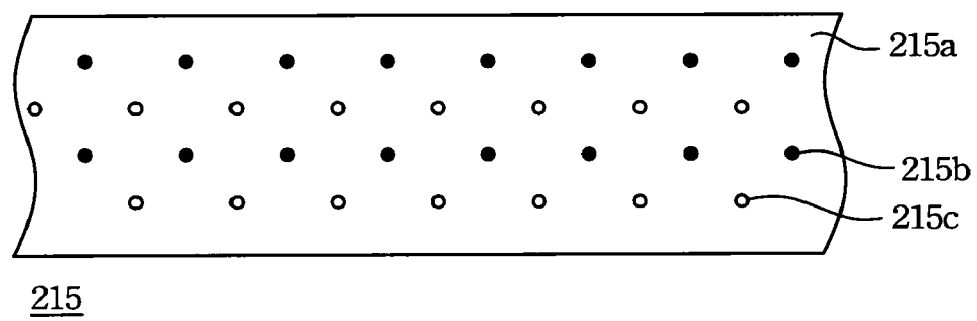
FIG. 4 is a cross-sectional diagram of an adhesion layer according to another embodiment.

According to another embodiment, the adhesion layer 215 can further comprise micro-beads. FIG. 4 is a cross-sectional diagram of an adhesion layer according to another embodiment. In FIG. 4, micro-beads 215c are also dispersed in the adhesive 215a and have different refractive index from that of the adhesive 215a. Therefore, micro-beads 215c can increase light scattering to prolong the light path in the adhesion layer 215 and thus increase the opportunity of being absorbed by the blue colorant 215b. Consequently, the usage amount of the blue colorant 215b can be decreased. According to an embodiment, the refractive index of micro-beads 215c is about 1.3-2.5 and preferably to be 1.4-1.55. The absolute value of the refractive index difference between the micro-beads 215c and the adhesive 215a is about 0.05-0.2. The content of the micro-beads is about 5-15 parts by weight when the sum of the micro-beads, the blue colorant, and the adhesive is 100 parts by weight The shape of the micro-beads 215c has no special limitations. The shape of the micro-beads 215c can be spherical, rhombus, elliptical, rice-grain-shaped, or biconvex-shaped, for example. According to an embodiment, the shape of the micro-beads 215c is spherical. The average particle diameter is about 1-25 μm, preferably 1-15 μm, and more preferably 1-10 μm. When the average particle diameter of the micro-beads 215c is smaller than 1 μm, the light scattering effect of the micro-beads 215c is poor. When the average particle diameter of the micro-beads 215c is more than 25 μm, the adhesion layer 215 can not be uniformly coated.

The material of the micro-beads 215c can be transparent or semi-transparent material, such as glass, plastic, metal oxide, or any combinations thereof. The plastic above can be, but not limited to, acrylic resin, styrene resin, polyurethane resin, silicone resin, or any combinations thereof. According to an embodiment, the material of the micro-beads 215c is acrylic resin or silicone resin. The metal oxide above can be, but not limited to, $TiO_2$, $SiO_2$, ZnO, $Al_2O_3$, $ZrO_2$, or any combinations thereof.

According to another embodiment, light-gathering microstructures (not shown in FIG. 2) can be further disposed on the outer surface 220a of the quarter wave plate 220 in FIG. 2. The light-gathering microstructures can gather some light of oblique viewing angles into the normal viewing angle to average the chromaticity difference. Therefore, the chromaticity difference is between the normal viewing and the oblique viewing angle can be decreased, and the light intensity of the screen can be increased. The material of the light-gathering microstructures has no special limitations. The only limitation is the material has to be transparent or semi-transparent. According to an embodiment, the material of the light-gathering microstructures can be acrylate-based resin. The refractive index of the light-gathering microstructures has to be larger than the refractive index of air. According to an embodiment, the refractive index of the c microstructures is about 1.49-1.65.

The shape of the light-gathering microstructures can be, but not limited to, prism-shaped, lenticular-shaped, conical-shaped, pyramidal-shaped, microlens-shaped, or any combinations thereof. According to an embodiment, the shape of the light-gathering microstructures is prism-shaped, lenticular-shaped, or microlens-shaped. According to another embodiment, the height of the light-gathering microstructures is about 5-100 μm.

Figure 5:
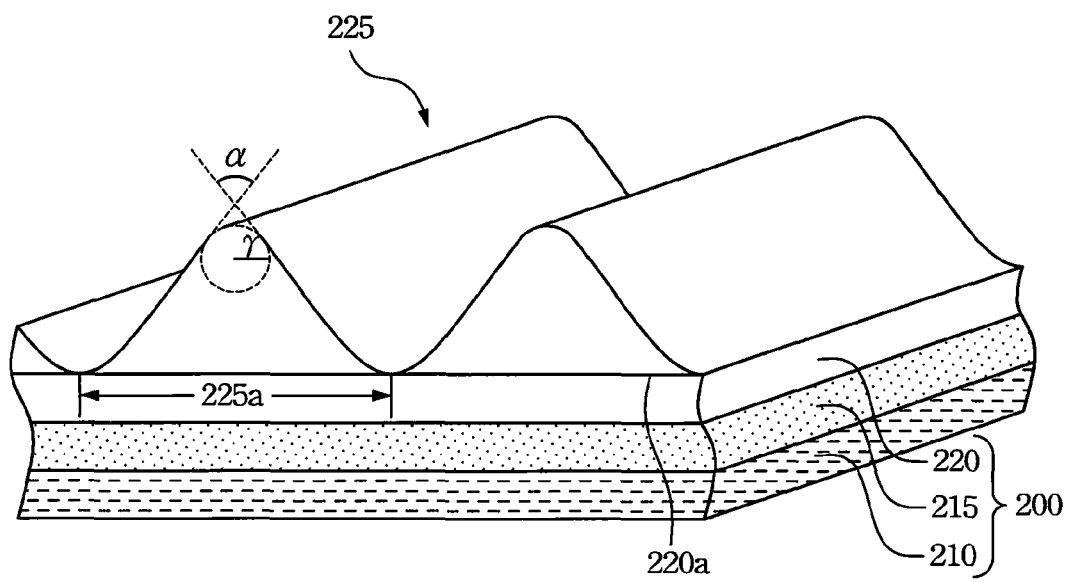
FIG. 5 is a three-dimensional diagram of prism-shaped light-gathering microstructures according to an embodiment.

FIG. 5 is a three-dimensional diagram of prism-shaped light-gathering microstructures according to an embodiment. In FIG. 5, prism-shaped light-gathering microstructures 225 are located on the outer surface 220a of the quarter wave plate 220 in the reflective polarizer 200. According to an embodiment, the distance 225a between adjacent valleys of the prism-shaped light-gathering microstructures 225 is about 1-100 μm, and 20-70 μm according to another embodiment. According to an embodiment, the curvature of the prism top angle of the prism-shaped light-gathering microstructures 225 is smaller than 10 μm. According to another embodiment, the curvature of the prism top angle is about 1-5 μm. According to yet another embodiment, the curvature of the prism top angle is about 1-4 μm. According to an embodiment, the prism top angle of the prism-shaped light-gathering microstructures 225 is about 95-130 degrees. According to another embodiment, the prism top angle of the prism-shaped light-gathering microstructures 225 is about 100-120 degrees.

Figure 6:
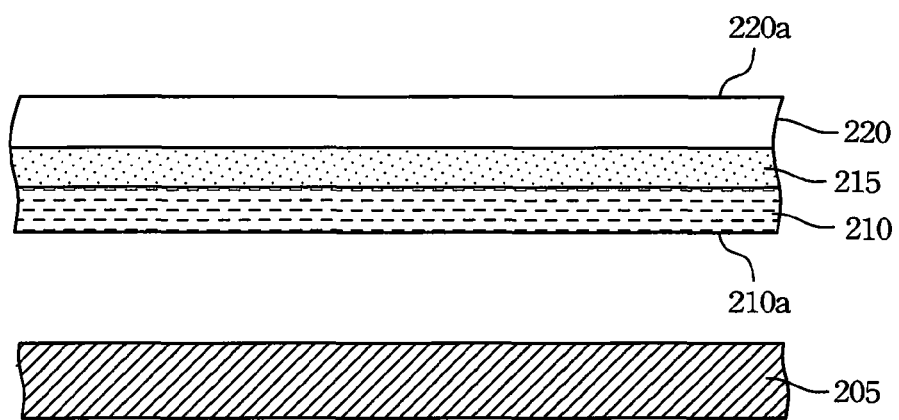
FIG. 6 is a cross-sectional diagram of a reflective polarizer and a strippable optical substrate according to an embodiment.

FIG. 6 is a cross-sectional diagram of a reflective polarizer and a strippable optical substrate according to an embodiment. In FIG. 6, an optical substrate 205 can be further disposed on the outer surface 210a of the cholesteric liquid crystal layer 210 to be a support when needed.

There are no special limitations for the optical substrate 205 to be a temporary or permanent support. The optical substrate 205 can be temporarily or permanently disposed on the outer surface 210a of the cholesteric liquid crystal layer 210. The possible situation for the optical substrate 205 to be a temporary support can be the situation as follow. When the cholesterol liquid crystal molecules contain cross-linking functional groups, the reflective polarizer 200 can be heated or irradiated to cross-link the cholesterol liquid crystal molecules. Therefore, the cholesteric liquid crystal layer 210 does not need the optical substrate 205 any more, and the optical substrate 205 can be stripped off.

The material of the optical substrate 205 can be glass or plastics. The plastics can be, but not limited to, polyester resin, such as polyethylene terephthalate (PET), polyacrylate resin, such as polymethylmethacrylate (PMMA), polyolefin resin, such as polyethylene (PE) or polypropylene (PP), polyimide resin, polycarbonate resin, polyurethane resin, triacetyl cellulose (TAC), or any combinations thereof. According to an embodiment, the material is of the optical substrate 205 is PET, PMMA, TAC, or any combinations thereof.

Application of Reflective Polarizer

Figure 7:
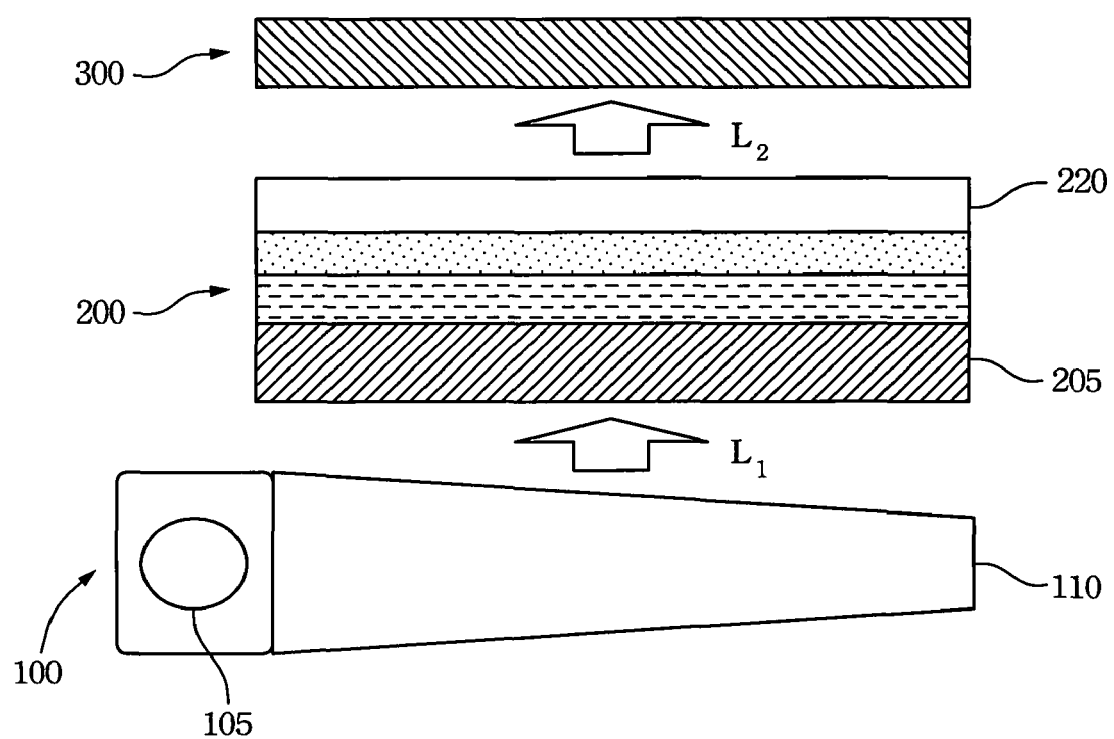
FIG. 7 is a cross-sectional diagram of a liquid crystal display.

FIG. 7 is a cross-sectional diagram of a liquid crystal display (LCD). In FIG. 7, a backlight module 100 comprises a light source 105, a light guide plate 110, and the reflective polarizer 200 as described above. The light from the light source 105 is guided by the light guide plate 110 to emit from the light guide plate 110 as the unpolarized light $L_1$. The unpolarized light $L_1$ strikes the reflective polarizer 200 from the optical substrate 205 side and emits from the quarter wave plate 220 side as the linearly polarized light $L_2$, which has been compensated for chromaticity difference. The linearly polarized light $L_2$, which has compensated for chromaticity difference, can be directly used as the light source of the LCD 300. The backlight module 100 can be, but not limited to, direct type backlight module or edge type backlight module.

When the reflective polarizer 200 applied in the backlight module 100, the backlight module needs to meet the requirements below:

1. $\Delta X_{0°}=[(\Delta x_{0°})^2+(\Delta y_{0°})^2]^{1/2} \leqq 0.04$, wherein $\Delta x_{0°}$ and $\Delta y_{0°}$ are absolute values of chromaticity differences, viewed from a normal direction, between liquid crystal displays (LCDs) with and without the reflective polarizer respectively at x axis and y axis.

2. $\Delta X_{60°}=[(\Delta x_{60°})^2+(\Delta y_{60°})^2]^{1/2} \leqq 0.07$, wherein $\Delta x_{60°}$ and $\Delta y_{60°}$ are absolute values of chromaticity differences between a normal viewing angle and a horizontal viewing angle at 60° of a LCD with the reflective polarizer respectively at x axis and y axis.

The light source 105 can be any types that can provide visible light, and is the number of the light source 105 can be determined by the actual needs. The types of the light source 105 can be cold-cathode fluorescent lamps (CCFL), light emitting diode (LED), organic LED (OLED), polymer LED (PLED), external electrode fluorescent lamp (EEFL), flat flourecent lamp (FFL), carbon nanotube field emission device, halogen lamp, xenon lamp, or high pressure mercury lamp. According to an embodiment, the light source 105 can be one or many CCFLs disposed on any positions of the light guide plate 110 depending on the actual needs.

The backlight module 100 can further comprises one or more optical films having various functions. The optical films can be, but not limited to, optical diffusion film or brightness enhancement film, for example.

In addition to be applied in the backlight module 100, the reflective polarizer 200 also can be attached to the outer surface of the LCD 300.

Working Examples and Comparing Examples

Compositions for Preparing Adhesion Layer

Working examples and comparing examples of compositions for preparing adhesion layers are disclosed here.

There are three kinds of compositions for preparing the adhesion layers, first compositions without blue colorant, second compositions having blue colorant, and third compositions having blue colorant and micro-beads. The preparation methods for the three compositions are described below.

1. Composition A without Blue Colorant:

Pressure sensitive adhesive (acrylate resin, AO-802 produced by Eternal Company) and solvent (ethyl acetate) were mixed and stirred to form a uniform solution having a solid content of about 25 wt %. The uniform solution was the composition A shown in Table 1.

2. Compositions B-E Having Blue Colorant:

Blue dye (D96 produced by Ciba Company) was dissolved in solvent (ethyl acetate), and pressure sensitive adhesive (acrylate resin, AO-802 produced by Eternal Company) was than added into the solution. The mixture was stirred to form a uniform solution having a solid content of about 25 wt % to be the compositions B-E shown in Table 1.

3. Composition F Having Blue Colorant and Micro-Beads:

Blue dye (D96 produced by Ciba Company) was dissolved in solvent (ethyl acetate), and micro-beads (acrylate resin, refractive index 1.49) and pressure sensitive adhesive (acrylate resin, AO-802 produced by Eternal Company) were than added into the solution. The mixture was stirred to form a uniform solution having a solid content of about 25 wt % to be the composition F shown in Table 1.

Next, the compositions A-F were respectively coated to form a thin film having a thickness of about 25 μm. Color measurement spectrophotometer (Color Quest XE, Hunter Company) was used to measure the b* value of the to thin films above by following the JIS Z8729 standard. The results were shown in Table 1.

TABLE 1

Compositions for preparing various adhesion layers and b* value of the adhesion layers

| Compositions | Adhesive (wt %) | Blue Colorant (wt %) | Micro-beads (wt %) | b* value |
|---|---|---|---|---|
| A | 100 | 0 | 0 | 0.71 |
| B | 99.995 | 0.0050 | 0 | −0.07 |
| C | 99.99 | 0.0100 | 0 | −0.55 |
| D | 99.975 | 0.0250 | 0 | −1.68 |
| E | 99.95 | 0.0500 | 0 | −3.99 |
| F | 89.995 | 0.0050 | 10 | −0.95 |

For compositions A-E in Table 1, the b* value was more negative when more blue colorant was added in the compositions. For compositions B and F, same amount of blue colorant is added in the compositions, but micro-beads were further added in the composition F. The b* value of the composition F is more negative than the composition B. That is, the added micro-beads can make the adhesion layer obtain a more negative b* value. Therefore, the added micro-beads can be used to decrease the addition amount of the blue colorant to maintain the same b* value of the adhesion layer.

Preparing Reflective Polarizer and Assembling Backlight Module

Working examples and comparing examples of preparing reflective polarizer are disclosed here.

For the reflective polarizer without light-gathering microstructures, the preparation method is described below. First, the composition for preparing the adhesion layer was coated on the cholesteric liquid crystal layer (nematic liquid crystal LC1057 doped with chiral molecules LC576, BASF Company) to form the adhesion layer. A quarter wave plate (stretched type polycarbonate) was then laminated onto the adhesion layer.

For the reflective polarizer with light-gathering microstructures, the preparation method is described below. First, the composition for preparing the adhesion layer was coated on the cholesteric liquid crystal layer (nematic liquid crystal LC1057 doped with chiral molecules LC576, BASF Company) to form the adhesion layer. A quarter wave plate (stretched type polycarbonate) was then attached onto the adhesion layer. Next, light-gathering microstructures (prism-shaped) were formed on the quarter wave plate.

The reflective polarizer was then disposed in the backlight module of 7 inch Eee PC (Eee PC 4G, Asus Company). The backlight module of 7 inch Eee PC further included an optical diffusion film (DI-500C, Eternal Company) and a prism sheet (PF-971, Eternal Company).

Working examples and comparing examples of the backlight modules containing the various reflective polarizers were listed in Table 2.

TABLE 2

Working examples and comparing examples of the backlight modules containing the various reflective polarizers.

| Working/comparing examples | Compositions for preparing adhesion layer | Prism-shaped light-gathering microstructures |
|---|---|---|
| Working example 1a | Composition B | — |
| Working example 2a | Composition C | — |
| Working example 3a | Composition D | — |
| Working example 4a | Composition E | — |
| Working example 5a | Composition F | — |
| Working example 6a | Composition F | Apex angle 90° |
| Working example 7a | Composition F | Apex angle 108° |
| Working example 8a | Composition F | Apex angle 120° |
| Comparing example 1a* | — | — |
| Comparing example 2a | Composition A | — |

*No reflective polarizer was disposed in the backlight module of the comparing example 1a.

Brightness Measurements

The backlight modules of the working examples 1a-8a and the comparing example 1a were respectively covered with a LCD panel to form various LCD modules of working examples 1b-8b and the comparing example 1b, and then brightness of the above LCD modules was measured by a luminance meter (Model SC-777, Tocon Company). The luminance meter was disposed at a distance of 50 cm from an external light source. The central luminance in cd/m$^2$ of the above LCD modules was then measured by the luminance meter at a measuring angle of 2°. Next, the central luminance of to the LCD modules in working examples 1b-8b was respectively divided by the central luminance of the comparing example 1b and then minus 1 to obtain the brightness gain. The results were listed in Table 3.

TABLE 3

The brightness gain of the LCD modules in working examples
1-8 and the comparing example 1.

| Working/<br>comparing examples | Central<br>Luminance<br>(cd/m$^2$) | Brightness<br>Gain<br>(%) |
| --- | --- | --- |
| Working example 1b | 206.5 | +43 |
| Working example 2b | 201.3 | +39 |
| Working example 3b | 197.1 | +36 |
| Working example 4b | 184.7 | +28 |
| Working example 5b | 203.7 | +41 |
| Working example 6b | 168.7 | +17 |
| Working example 7b | 154.8 | +7 |
| Working example 8b | 151.6 | +5 |
| Comparing example 1b | 144.8 | 0 |

In Table 3, the central luminance of the LCD module containing the backlight module without reflective polarizer (comparing example 1b) is only 144.8 cd/m$^2$. The central luminance of the LCD module containing the backlight module with the reflective polarizer (working examples 1b-8b) could be increased to 151.6-206.5 cd/m$^2$. The brightness gains for the working examples 1b-8b were 5%-43%, respectively.

Chromaticity Difference Measurements

Chromaticity of the normal viewing angle (0°) and the horizontal viewing angle θ (60°) was measured to calculate the chromaticity difference between the normal viewing angle and the horizontal viewing angle θ. The chromaticity and the chromaticity difference were measured by luminance meter (Model SC-777, Topcon Company). The results were shown in Table 4.

TABLE 4

The chromaticity and chromaticity difference of
the working examples and comparing examples.

| Working/<br>comparing<br>examples | Chromaticity<br>of the normal<br>viewing angle | | Chromaticity<br>difference<br>1* | | Chromaticity<br>difference<br>2** | | Chromaticity<br>difference<br>3*** | |
| --- | --- | --- | --- | --- | --- | --- | --- | --- |
| | $x_{0°}$ | $y_{0°}$ | $\Delta x_{0°}$ | $\Delta y_{0°}$ | $\Delta x_{60°}$ | $\Delta y_{60°}$ | $\Delta X_{0°}$ | $\Delta X_{60°}$ |
| Working example 1b | 0.329 | 0.349 | 0.012 | 0.036 | 0.058 | 0.035 | 0.038 | 0.068 |
| Working example 2b | 0.328 | 0.348 | 0.011 | 0.035 | 0.053 | 0.034 | 0.037 | 0.063 |
| Working example 3b | 0.326 | 0.348 | 0.009 | 0.035 | 0.048 | 0.032 | 0.036 | 0.058 |
| Working example 4b | 0.318 | 0.341 | 0.001 | 0.028 | 0.048 | 0.035 | 0.028 | 0.059 |
| Working example 5b | 0.324 | 0.330 | 0.007 | 0.017 | 0.042 | 0.031 | 0.018 | 0.052 |
| Working example 6b | 0.326 | 0.328 | 0.009 | 0.015 | 0.016 | 0.014 | 0.017 | 0.021 |
| Working example 7b | 0.322 | 0.325 | 0.005 | 0.012 | 0.049 | 0.039 | 0.013 | 0.063 |
| Working example 8b | 0.322 | 0.326 | 0.005 | 0.013 | 0.049 | 0.04 | 0.014 | 0.063 |
| Comparing example 1b | 0.317 | 0.313 | — | — | — | — | — | — |
| Comparing example 2b | 0.333 | 0.355 | 0.016 | 0.042 | 0.063 | 0.043 | 0.045 | 0.076 |

*In chromaticity difference 1, □$x_{0°}$ and □$y_{0°}$ were absolute values of chromaticity differences, viewed from a normal direction, between backlight modules with the reflective polarizer (working examples 1-8 and comparing example 2) and without the reflective polarizer (comparing example 1) respectively at x axis and y axis.
**In chromaticity difference 2, □$x_{60°}$ and □$y_{60°}$ were absolute values of chromaticity differences between a normal viewing angle and a horizontal viewing angle at 60° of a backlight modules with the reflective polarizer (working examples 1-8 and comparing example 2) respectively at x axis and y axis.
***In chromaticity difference 3, $\Delta X_{0°}$ and $\Delta X_{60°}$ were calculated by the following formula:
$\Delta X_{0°} = [(\Delta x_{0°})^2 + (\Delta y_{0°})^2]^{1/2}$
$\Delta X_{60°} = [(\Delta x_{60°})^2 + (\Delta y_{60°})^2]^{1/2}$ In Table 4, the backlight modules of the working examples 1-4 had the reflective polarizer containing the blue colorant, and the backlight module of the comparing example 2 had the reflective polarizer without the blue colorant. From Table 4, it could be known that $\Delta X_{0°}$ and $\Delta X_{60°}$ of the working examples 1-4 were smaller than those of the comparing example 2. Accordingly, the backlight modules having the reflective polarizer containing the blue colorant can decrease the chromaticity difference between the normal viewing angle and the large horizontal viewing angle (60°).

In Table 4, the backlight module of the working example 5 had the reflective polarizer containing the blue colorant and micro-beads, and the backlight module of the comparing example 2 had the reflective polarizer without the blue colorant and the micro-beads. From Table 4, it could be known that $\Delta X_{0°}$ and $\Delta X_{60°}$ of the working example 5 is obviously smaller than those of the comparing example 2. Accordingly, in the improvement of the chromaticity difference, the addition of the blue colorant and the micro-beads in the adhesion layer can compete with the addition of large amount of blue colorant in the adhesion layer (working example 4).

In Table 4, the backlight modules of the working examples 6-8 had the reflective polarizer having light-gathering microstructures, and the backlight modules of the working examples 1-5 had the reflective polarizer without light-gathering microstructures. From Table 4, it could be known that $\Delta X_{0°}$ and $\Delta X_{60°}$ of the working examples 6-8 were even smaller than those of working examples 1-5. Accordingly, the light-gathering microstructures on the reflective polarizer could further decrease the chromaticity difference caused by the cholesteric liquid crystal phase reflective polarizer, especially the chromaticity difference in the normal viewing angle, and decrease the chromaticity difference between the normal viewing angle and the large horizontal viewing angle (60°).

Accordingly, less than or equal to 0.1 wt % of blue colorant can be added in the adhesion layer of a cholesteric liquid crystal phase reflective polarizer to compensate the problem of the chromaticity difference caused by the reflective polarizer itself and the large horizontal viewing angle. Collocating cholesteric liquid crystal phase reflective polarizer with micro-beads in the adhesion layer thereof or light-gathering microstructures on the quarter wave plate thereof can further improve the problem of the chromaticity difference. In addition, the brightness can be increased.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:
1. A reflective polarizer, comprising:
   a cholesteric liquid crystal (LC) layer;
   a quarter wave plate; and
   an adhesion layer located between the cholesteric LC layer and the quarter wave plate, wherein the adhesion layer comprises:
   an adhesive;
   a blue colorant; and
   a plurality of micro-beads, wherein the content of the micro-beads is about 5-15 parts by weight when the sum of the micro-beads, the blue colorant, and the adhesive is 100 parts by weight.

2. The reflective polarizer of claim 1, wherein b* value of the adhesive layer is about −6.0-0.35, and the b* value is determined by CIE L*a*b* color space.

3. The reflective polarizer of claim 1, wherein the blue colorant is a blue dye, a blue pigment, or a blue fluorescent material.

4. The reflective polarizer of claim 3, wherein the blue colorant is a blue dye.

5. The reflective polarizer of claim 1, wherein the blue colorant is about 0.001-0.1 parts by weight when the sum of the blue colorant and the adhesive is 100 parts by weight.

6. The reflective polarizer of claim 1, wherein the blue colorant is about 0.005-0.05 parts by weight when the sum of the blue colorant and the adhesive is 100 parts by weight.

7. The reflective polarizer of claim 1, wherein the adhesive is a pressure sensitive adhesive.

8. The reflective polarizer of claim 1, wherein absolute value of a difference between the refractive index of the micro-beads and that of the adhesive is about 0.05-0.2.

9. The reflective polarizer of claim 1, wherein an average particle diameter of the micro-beads is about 1-25 μm.

10. The reflective polarizer of claim 1, wherein the micro-beads are made of glass, plastic, metal oxide or any combinations thereof.

11. The reflective polarizer of claim 1, further comprising a plurality of light-gathering microstructures on the outer surface of the quarter wave plate.

12. The reflective polarizer of claim 11, wherein a shape of the light-gathering microstructures is prism-shaped, lenticular, conical, pyramidal, microlens-shaped, or any combinations thereof.

13. The reflective polarizer of claim 12, wherein a curvature of the prism top angle is smaller than 10 μm when the light-gathering microstructures are prism-shaped.

14. The reflective polarizer of claim 1, wherein the adhesive is an acrylate resin.

15. The reflective polarizer of claim 1, wherein the cholesteric LC is made by single-layer or multi-layer of cholesteric LC.

16. The reflective polarizer of claim 1, wherein the cholesteric LC is composed by cholesteric LCs having various pitches.

17. The reflective polarizer of claim 1, further comprising an optical substrate.

18. A backlight module, comprising:
a light source;
a light guide for guiding the light-emitting direction of the light source; and
the reflective polarizer of claim 1 located on the light-emitting surface,
wherein the backlight module satisfies the following conditions:
$\Delta X_{0°}=[(\Delta X_{0°})^2)(\Delta y_{0°})^2]^{1/2} \leq 0.04$, wherein $\Delta x_{0°}$ and $\Delta y_{0°}$ are absolute values of chromaticity differences, viewed from a normal direction, between liquid crystal displays (LCDs) with and without the reflective polarizer respectively at x axis and y axis; and
$\Delta X_{60°}=)[(\Delta x_{60°})^2+(\Delta y_{60°})^2]^{1/2} \leq 0.07$, wherein $\Delta x_{60°}$ and $\Delta y_{60°}$ are absolute values of chromaticity differences between the normal viewing angle and a horizontal viewing angle at 60° of a LCD with the reflective polarizer respectively at x axis and y axis.

* * * * *